United States Patent
Kawashima

(10) Patent No.: US 6,549,767 B1
(45) Date of Patent: Apr. 15, 2003

(54) TELEPHONY TERMINAL APPARATUS CAPABLE OF REPRODUCING SOUND DATA

(75) Inventor: Takahiro Kawashima, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 399 days.

(21) Appl. No.: 09/650,936

(22) Filed: Aug. 29, 2000

(30) Foreign Application Priority Data

Sep. 6, 1999 (JP) .......................................... 11-251387

(51) Int. Cl.[7] ................................................ H04Q 7/20
(52) U.S. Cl. ........................ 455/412; 455/413; 455/414
(58) Field of Search ................................ 455/412, 413, 455/414, 415, 416, 417, 418, 419

(56) References Cited

U.S. PATENT DOCUMENTS

| | | | | |
|---|---|---|---|---|
| 5,592,532 A | * | 1/1997 | Koizumi | 455/412 |
| 5,737,394 A | * | 4/1998 | Anderson et al. | 379/88.11 |
| 6,097,941 A | * | 8/2000 | Helferich | 455/412 |
| 6,161,007 A | * | 12/2000 | McCutcheon et al. | 455/412 |
| 6,219,638 B1 | * | 4/2001 | Padmanabhan et al. | 704/235 |
| 6,230,186 B1 | * | 5/2001 | Yaker | 709/206 |
| 6,246,983 B1 | * | 6/2001 | Zou et al. | 704/260 |
| 6,249,808 B1 | * | 6/2001 | Seshadri | 709/206 |
| 6,366,651 B1 | * | 4/2002 | Griffith et al. | 379/88.14 |
| 6,415,021 B1 | * | 7/2002 | Oh | 379/88.13 |
| 6,421,353 B1 | * | 7/2002 | Kim | 370/465 |
| 2002/0055350 A1 | * | 5/2002 | Gupte et al. | 455/412 |

* cited by examiner

Primary Examiner—Thanh Cong Le
Assistant Examiner—Tan Trinh
(74) Attorney, Agent, or Firm—Morrison & Foerster LLP

(57) ABSTRACT

In a telephony terminal apparatus for exchanging a message with the other party through a telephone line, a memory section memorizes sound data representing a sound message composed of either of a voice sound and a music sound. A selector section selects mode information effective to specify a mode of exchanging a message. A transmitter section transmits the memorized sound data to the other party together with the selected mode information, thereby enabling the other party to receive the transmitted sound data and to reproduce therefrom the sound message according to the specified mode. The selector section may select a realtime mode effective to enable the other party to receive the sound data and to process the received sound data in realtime to automatically reproduce the sound message as a ringing sound to notify a call termination.

51 Claims, 6 Drawing Sheets

TELEPHONY TERMINAL APPARATUS CAPABLE OF REPRODUCING SOUND DATA

BACKGROUND OF THE INVENTION

1. Field of the Invention

The present invention relates to a telephony terminal apparatus that can be used for a car telephone, a portable telephone, or the like.

2. Description of Related Art

There is known an email transfer service that allows an email to be transferred from a user's portable telephone terminal apparatus to a telephone address of a called party. This email transfer service has been available with a portable telephone system, such as a personal digital cellular telecommunication system (PDC) known as an analog cellular system or a digital cellular system, and a personal handyphone system (PHS). Email that can be transferred is generally limited to a message consisting of a character string of a few tens to a few hundreds of characters. When such email is received, an incoming call sound or ringing sound announcing an arrival of email is sounded and the email is saved in a receiving box. The email is read out and displayed on a display monitor in response to an instruction given by a user.

The conventional telephone terminal apparatuses mentioned above, however, have been posing a disadvantage in that the user has to identify a sender and contents of an email message by reading the message shown on the display monitor after hearing the incoming call sound, which is given upon an arrival of the email.

There has been another disadvantage in that the email transfer service enables only an email that can be displayed on a display monitor to be transferred, making it impossible to transfer an audible type of information that also allows a message to be transmitted.

SUMMARY OF THE INVENTION

Accordingly, an object of the present invention is to provide a telephone terminal apparatus that allows a called party to check a sender of email or contents of a message in the email without the need for displaying the email on a display monitor.

It is another object of the present invention to provide a telephone terminal apparatus that permits an email displayed on a monitor and that can treat other type of information capable of transmitting a message.

It is yet another object of the present invention to provide a telephone terminal apparatus capable of reproducing a transferred sound message in various modes.

In one aspect of the invention, a telephony terminal apparatus is constructed for exchanging a message with the other party through a telephone line. The inventive apparatus comprises a memory section that memorizes sound data representing a sound message composed of either of a voice sound and a music sound, a selector section that selects mode information effective to specify a mode of exchanging a message, and a transmitter section that transmits the memorized sound data to the other party together with the selected mode information, thereby enabling the other party to receive the transmitted sound data and to reproduce therefrom the sound message according to the specified mode.

Preferably, the selector section can select mode information specifying a realtime mode effective to enable the other party to receive the sound data and to process the received sound data in realtime to automatically reproduce the sound message as a ringing sound to notify a call termination.

Alternatively, selector section can select mode information specifying a sequential mode effective to enable the other party to receive the sound data when the telephone line is connected after a call termination and effective to process the received sound data to reproduce the sound message after the telephone lines is connected.

Preferably, the telephony terminal apparatus further comprises a collecting section that collects a sound message, and a coding section that compressively encodes the collected sound message into sound data suitable for transmission. Further, the telephony terminal apparatus comprises a converter section that converts the sound data representing a sound message composed of a singing voice sound into music data representing a melodious music sound corresponding to the singing voice sound.

Preferably, the transmitter section transmits the memorized sound data to the other party through a wireless telephone line.

In another aspect of the invention, the telephony terminal apparatus comprises a port section that enters a call signal containing mode information from the other party, the mode information specifying a mode of exchanging a message, a receiver section that operates when the mode information specifies a realtime mode for receiving sound data from the other party immediately after the call signal, the sound data representing a sound message composed of either of a voice sound and a music sound, a memory section that stores the received sound data, and a reproduction section that instantly processes the stored sound data to automatically reproduce the sound message as a ringing sound to notify a call termination.

Preferably, the receiver section receives the sound data in a compressively encoded form from the other party, the apparatus further comprising a decoding section that expansively decodes the compressively encoded form of the received sound data. Further, the receiver section receives the sound data from the other party through a wireless telephone line.

In still another aspect of the invention, the telephony terminal apparatus comprises a port section that responds to a call signal from the other party for generating a ringing sound when the call signal contains mode information specifying a sequential mode of exchanging a message, a receiver section that operates when the telephone line is connected to the other party in response to the ringing sound for receiving sound data from the other party, the sound data representing a sound message composed of either of a voice sound and a music sound, a memory section that stores the received sound data, and a reproduction section that processes the stored sound data to reproduce the sound message after the telephone line is connected.

In still another aspect of the invention, the telephony terminal apparatus comprises a writing section that can be operated to make an email message in the form of character data, a memory section that memorizes sound data representing a sound message composed of either of a voice sound and a music sound, an attaching section that operates when the sound message is attached to the email message for merging the sound data to the character data together with mode information specifying a mode of treating the sound message and the email message, and a transmitter section that transmits the sound data and the character data together with the mode information to the other party, thereby enabling the other party to reproduce the sound message and to display the email message according to the specified mode.

Preferably, the attaching section specifies the mode of treating the sound message and the email message such that the sound message attached to the email message is reproduced as a ringing sound when the email message is opened to display the character data.

Preferably, the attaching section specifies the mode of treating the sound message and the email message such that the sound message is automatically reproduced as a ringing sound at a call termination, and then the email message may be opened to display the character data.

Preferably, the attaching section specifies the mode of treating the sound message and the email message such that the sound message is reproduced if the telephone line is connected after a call termination, and then the email message may be opened to display the character data.

In still another aspect of the invention, the telephony terminal apparatus comprises a port section that responds to a call signal from the other party for generating a ringing sound to notify arrival of an email message accompanied by a sound message, a receiver section that operates when the ringing sound is generated for automatically receiving the email message in the form of character data and for receiving the sound message in the form of sound data representing either of a voice sound and a music sound, a memory section that stores the received character data and the sound data, a reproduction section that operates when the email message is opened for processing the stored sound data to reproduce the sound message, and a display section that operates when the email message is opened for displaying the stored character data.

In still another aspect of the invention, the telephony terminal apparatus comprises a port section that enters a call signal containing mode information from the other party, the mode information specifying a mode of exchanging a message, a receiver section that operates when the mode information specifies a realtime mode for automatically receiving an email message in the form of character data accompanied by a sound message in the form of sound data representing either of a voice sound and a music sound, a memory section that stores the received character data and the sound data, a reproduction section that instantly processes the stored sound data to automatically reproduce the sound message as a ringing sound, and a display section that operates when the email message may be opened after the ringing sound is generated for displaying the stored character data.

In still another aspect of the invention, the telephony terminal apparatus comprises a port section that responds to a call signal from the other party for generating a ringing sound to notify arrival of an email message accompanied by a sound message, a receiver section that operates when the telephone line is connected in response to the ringing sound for receiving the email message in the form of character data and for receiving the sound message in the form of sound data representing either of a voice sound and a music sound, a memory section that stores the received character data and the sound data, a reproduction section that operates when the telephone line is connected for processing the stored sound data to reproduce the sound message, and a display section that operates when the email message may be opened after the reproducing of the sound message for displaying the stored character data.

In a further aspect of the invention, the telephony terminal apparatus comprises an input section that provides sound data representing a sound message composed of either of a voice sound and a music sound, an authoring section that authors the sound data to edit the sound message, and a transmitter section that transmits the authored sound data to the other party, thereby enabling the other party to receive the authored sound data and to reproduce therefrom the edited sound message.

According to the present invention, compressed and encoded data consisting of speech voice or singing voice that has been collected, and/or musical data obtained by converting singing voice can be transferred as message data. When the transferred message data is reproduced on a realtime mode, the message data can be output in the form of an incoming call sound or ringing sound. With this arrangement, a sound message of voice or musical data can be transferred, and a calling party can be identified or contents of a message can be grasped by listening to the incoming message data when the message data is reproduced.

Furthermore, a party who has received transferred message data can select between a mode in which transferred message data is automatically received and reproduced on a realtime basis and another mode in which transferred message data is received and reproduced when a incoming call button is pressed to connect the telephone line after the call termination.

Moreover, message data can be attached to an email and transferred. In this mode, a party who has received the transferred email and message data can select between a mode in which the transferred email and message data is automatically received and reproduced on a realtime basis and another mode in which the transferred email and message data is received and reproduced when an incoming call button is pressed. Thus, message data and email can be reproduced in a plurality of reproducing modes.

In addition, it is possible to transfer message data in various modes, such as a mode in which compressed and encoded data or musical data are looped by a predetermined number of times, another mode in which a background music sound is synthesized with the compressed and encoded data, and a further mode in which an accompaniment music sound is added to musical data.

Thus, according to the present invention, audible information capable of transmitting a message in addition to an email can be transferred, and such information can be reproduced in various reproducing modes upon receipt.

DESCRIPTION OF THE PREFERRED EMBODIMENTS

Figure 1:
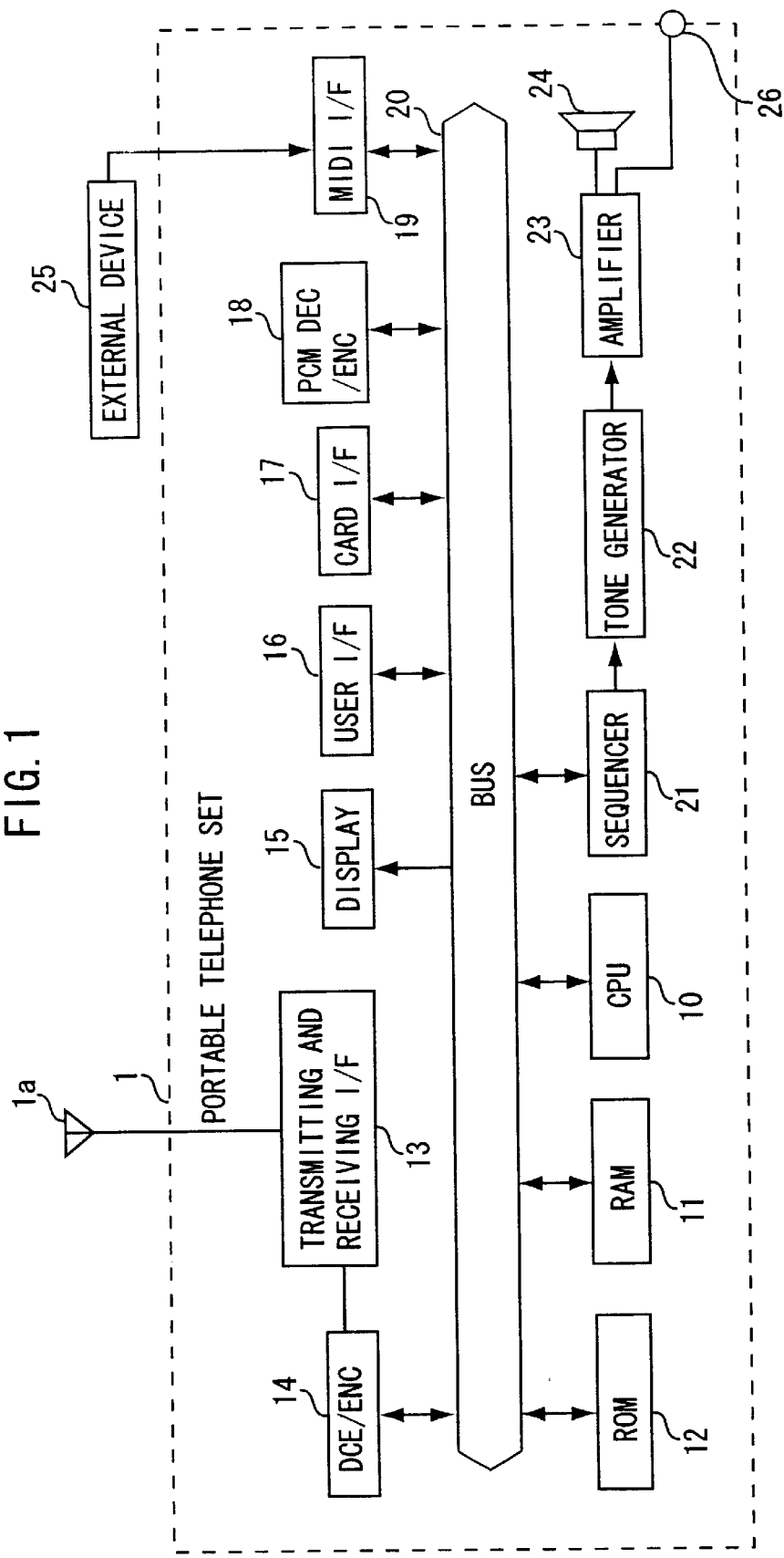
FIG. 1 is a diagram showing a configuration of an embodiment wherein a telephone terminal apparatus in accordance with the present invention is applied to a portable telephone.

FIG. 1 shows a configuration of an embodiment in which a telephone terminal apparatus in accordance with the present invention is applied to a portable telephone set. Referring to FIG. 1, a portable telephone 1 permits communication with another telephone by being connected via a radio line to a base station that controls radio zones. A typical cellular system in a portable telephone employs a small-zone system in which many radio zones are disposed in a service area. The base station controls the respective radio zones. When the portable telephone 1, which is a mobile station, communicates with a regular telephone, the portable telephone 1 is connected to an exchange via the base station, and connected to a regular telephone network through the exchange.

The portable telephone 1 is equipped with an antenna 1a, which is usually retractable. The antenna 1a is connected to a transmitting and receiving interface 13 that has a modulating and demodulating function. A central processing unit (CPU) 10 is a system control unit that executes a telephone function program to control transmitting and receiving operations in diverse modes in the portable telephone 1. The CPU 10 is provided with a timer for indicating an elapsed time during an operation and for generating timer interruptions at predetermined time intervals. A RAM 11 is a random access memory that primarily includes: an area for storing received data such as transferred email data, musical data in a MIDI format, compressed and encoded voice data that has been transferred as a speech voice or a singing voice; an area for storing data to be transmitted such as email data to be transferred to an associated party, musical data in the MIDI format, compressed and encoded voice data to be transferred as a speech voice or a singing voice; an area for storing user-defined data; and a work area for the CPU 10. A ROM 12 is a read only memory for storing programs, such as diverse telephone function programs for transmitting and receiving that are executed by the CPU 10, and various types of data, such as melody data or the like for an incoming call sound and a holding sound.

The transmitting and receiving I/F 13 demodulates signals received through the antenna 1a, and also modulates signals to be transmitted and supplies the modulated signals to the antenna 1a. A voice signal that has been demodulated by the transmitting and receiving I/F 13 is decoded by a decoding and encoding unit (DEC/ENC) 14. The input voice signal is further compressed and encoded by the DEC/ENC 14. The DEC/ENC 14 performs highly efficient compressing, encoding and decoding of voice for a conversation, and is constructed by, for example, a code excited LPC (CELP) type decoder/encoder. A display unit 15 displays a telephone function menu, character strings of transferred email, etc. A user interface (user I/F) 16 functions as an interface for a control panel composed of dialing buttons of 0 to 9 and other buttons, and a microphone that are provided on the portable telephone 1. A card interface (card I/F) 17 is used for adding an external memory card to the portable telephone 1. The memory card is a machine readable medium containing program instructions executable by the CPU 10 to cause the portable telephone set to perform the inventive method described below.

A PCM decoder and encoder unit (PCMDEC/ENC) 18 is a decoder/encoder that decodes compressed and encoded voice data of a speech voice or a singing voice that has been transferred, and compresses and encodes voice data of the speech voice or singing voice to be transferred to an associated party. The PCMDEC/ENC 18 adopts, for example, a MP3 (MPEG layer III) system or a compressing and encoding system that employs vector quantization. A MIDI interface 19 is provided for receiving musical data in a MIDI format from an external unit 25, such as a personal computer, that conforms to MIDI. A sequencer 21 interprets musical data in the MIDI format consisting of MIDI events, to which information regarding sound generation time or a time interval between notes that has been transferred and stored in the RAM 11 under the control of the CPU 10 has been added, and sets tone generator parameters at a tone generator 22 at a timing based on the information regarding time. An amplifier 23 amplifies musical signals that have been reproduced and output from the tone generator 22 and releases sound through a speaker 24, and outputs the amplified signals through an external output terminal 26. In this case, the tone generator 22 has a poly-phonic function so that it is capable of generating a plurality of sounds. Transfer of data and instructions to and from all blocks is accomplished via a bus 20.

Figure 2:
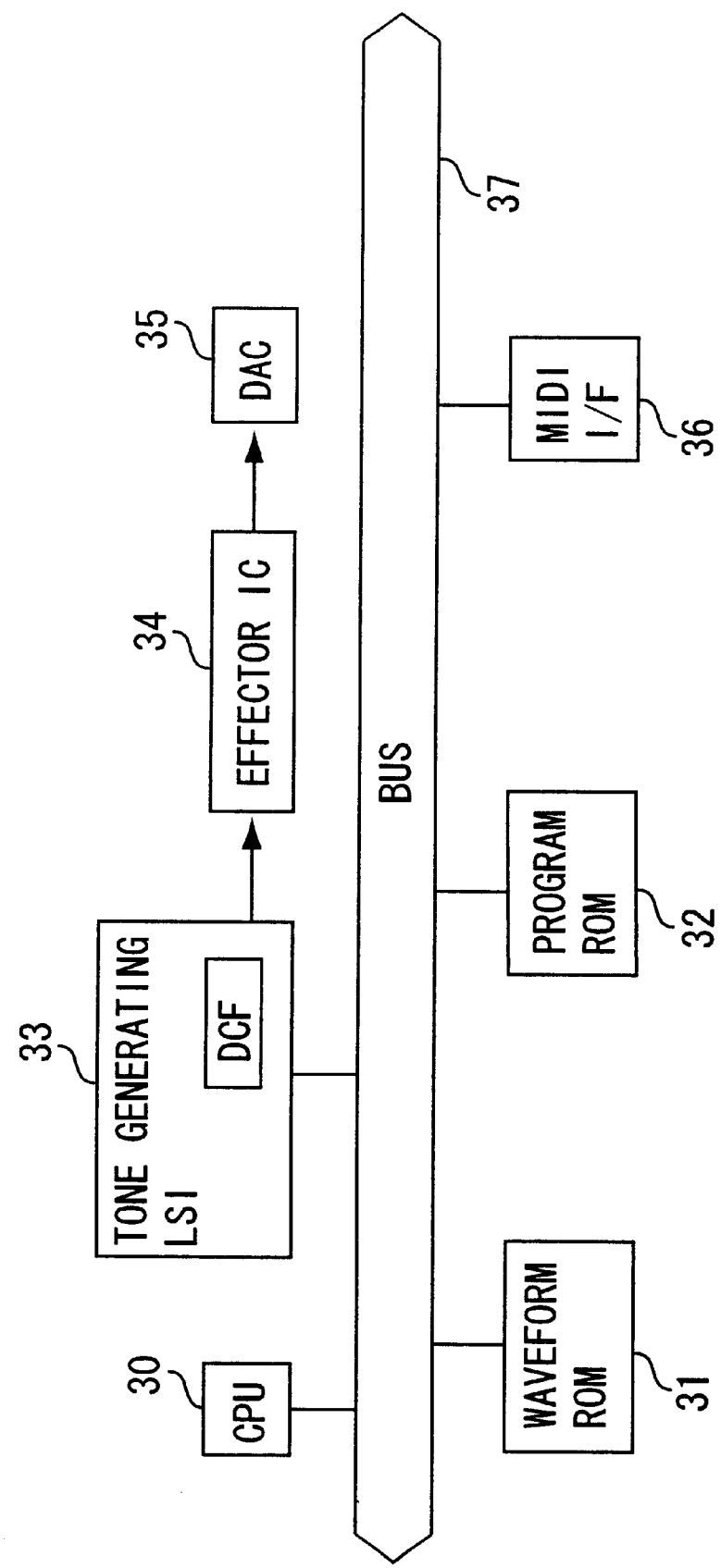
FIG. 2 is a diagram showing an example of a configuration of a PCM tone generator used in the telephone terminal apparatus in accordance with the present invention.

FIG. 2 illustrates an example of a tone generator configuration in which the tone generator 22 shown in FIG. 1 works as a PCM tone generator. A CPU 30 is a central processing unit that executes a musical sound generating program to thereby generate a musical sound by controlling an operation of each section of the tone generator 22. A program ROM 32 stores a musical sound generating program executed by the CPU 30. A waveform ROM 31 is a ROM wherein waveform samples for a variety of tones have been stored. A tone generating LSI 33 is a semiconductor chip that generates phase data based on information regarding a particular tone according to tone generating parameters in response to a note on event, and based on the phase data, generates musical sounds by reading a waveform, which is based mainly on the tone parameters, from the ROM 31. The tone generating LSI 33 is equipped with a digital filter (DCF) for adjusting higher harmonic components. An effector IC 34 incorporates an effect circuit for adding effects, such as reverb, chorus, and variations, to musical sound data generated by the tone generating LSI 33. A DAC 35 is a digital-analog converter that converts musical sound data output from the effector IC 34 for into analog signals at a predetermined sampling speed.

In the tone generator 22, tone generating parameters are set via a MIDI I/F 36. Tone generating parameters include pitch data, envelope parameters, note ON/OFF signals, volume parameters, effects parameters, etc. When a note ON signal is detected among tone generating parameters, phase data based on pitch data of the tone generating parameters is created by the tone generating LSI 33. Based on the created phase data, a waveform sample is read from the waveform ROM 31. The waveform read from the waveform ROM 31 is selected based on a set tone parameter. The waveform sample thus read is subjected to envelope processing based on the volume parameter or the envelope parameter among the tone generating parameters. Further, effects based on the effect parameters are added to the processed waveform sample by the effector IC 34. Then, the waveform sample is converted into analog signals by the DAC 35 at each predetermined reproducing timing, and output to the amplifier 23 concatenated to the tone generator 22. Thus, musical sound data in the MIDI format can be reproduced by the sequencer 21 and the tone generator 22.

An operation of the portable telephone 1 having the configuration shown in FIG. 1 will now be described, taking a case as an example wherein musical sound data in the MIDI format and voice data composed of compressed and encoded speech voice or singing voice (hereinafter generically referred to as "message data") is transferred to another portable telephone of an associated party that has the same configuration as that of the portable telephone 1. Hereinafter, the portable telephone commencing message transfer will be referred to as an "originating portable telephone" and the other portable telephone receiving transferred data will be referred to as a "terminating portable telephone."

Message data from the originating portable telephone can be transferred in a transfer mode selected from among (1) a realtime reproducing mode, (2) a message reproducing mode, (3) attaching-to-email mode, (4) attaching-to-email realtime reproducing mode, and (5) attaching-to-email message reproducing mode. A user can arbitrarily set any of the transfer modes by operating a button on a control panel while watching the display unit 15. The originating portable telephone and the terminating portable telephone perform different transmitting and receiving operations according to a set transfer mode. The following will describe the transmitting and receiving operations of the originating portable telephone and the terminating portable telephone in the respective transfer modes.

(1) Realtime Reproducing Mode
Originating Portable Telephone)

To form message data into compressed and encoded voice data, a speech voice or a singing voice is input through a microphone (not shown) as a sound message. The voice signal is captured via the user I/F 16, compressed and encoded by the PCMDEC/ENC 18, and stored in an area of RAM 11 for storing data to be transmitted (hereinafter referred to as "the transmitting buffer area"). To form the message data into musical sound data in the MIDI format, a singing voice is input through the microphone (not shown). The singing voice is captured via the user I/F 16, and the CPU 10 executes a program for converting the singing voice into musical sound data in the MIDI format so as to convert the singing voice into the corresponding musical sound data in the MIDI format. The converted musical sound data in the MIDI format is saved in the transmitting buffer area of the RAM 11. The singing voice in this case may be humming. The singing voice in the present invention includes humming.

To form message data into compressed and encoded voice data and musical sound data in the MIDI format, speech voice or singing voice for a sound message entered through a microphone is compressed and encoded, and saved in the transmitting buffer area of the RAM 11. At the same time, singing voice entered through the microphone may be converted into musical sound data in the MIDI format, and saved in the transmitting buffer area of the RAM 11.

Figure 3A:
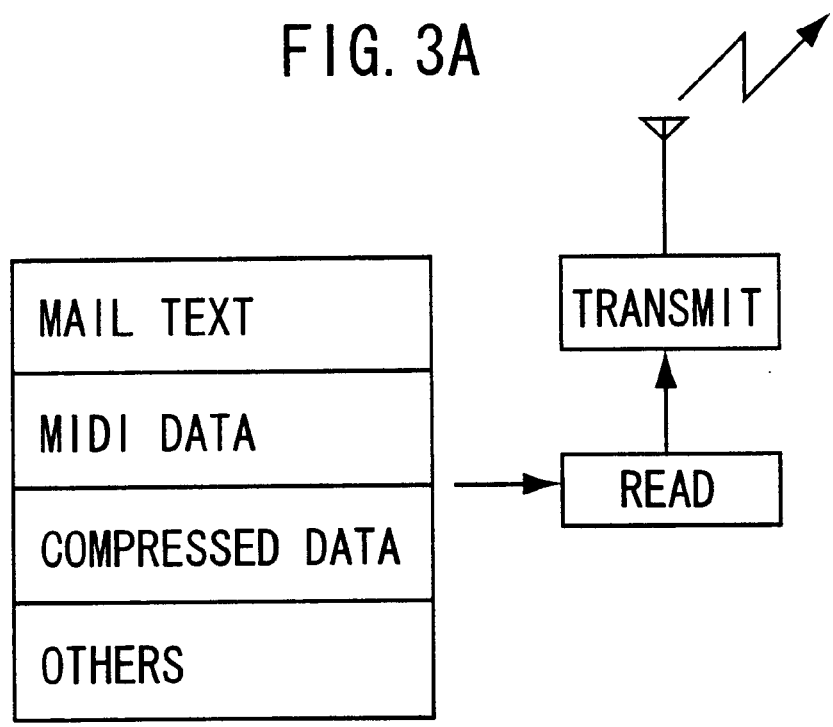
FIGS. 3A and 3B are a diagram for explaining data stored in a RAM in the telephone terminal apparatus in accordance with the present invention.

To transmit the message data saved in the transmitting buffer area of the RAM 11 as described above, the realtime reproducing mode is selected and set as the transfer mode by operating a button on the control panel. Then, a telephone number of the terminating portable telephone to which the message data is to be transferred is set by operating dialing buttons, and a transmission button is operated. This operation causes the message data to be read from the transmitting buffer area of the RAM 11, making the message data ready to be transmitted by the transmitting and receiving I/F 13 as shown in FIG. 3A. The message data to be transmitted may be either compressed and encoded voice data or musical sound data in the MIDI format, or both of the PCM data and MIDI data. The data to be transmitted includes mode information indicative of the specified realtime reproduction mode. In the musical sound data in the MIDI format, information regarding sound generation time and a time interval between notes (rests) is added to a MIDI event.

As described, the inventive telephony terminal apparatus is constructed for exchanging a message with the other party through a telephone line. In the apparatus, a memory section of the RAM 11 memorizes sound data representing a sound message composed of either of a voice sound and a music sound. A selector section of the user I/F 16 selects mode information effective to specify a mode of exchanging a message. A transmitter section of the transmitting and receiving I/F 13 transmits the memorized sound data to the other, party together with the selected mode information, thereby enabling the other party to receive the transmitted sound data and to reproduce therefrom the sound message according to the specified mode. The selector section can select mode information specifying a realtime mode effective to enable the other party to receive the sound data and to process the received sound data in realtime to automatically reproduce the sound message as a ringing sound to notify a call termination. The inventive telephony terminal apparatus further comprises a collecting section of the user I/F 16 that collects a sound message, and a coding section of the DCE/ENC 14 that compressively encodes the collected sound message into sound data suitable for transmission. The telephony terminal apparatus further comprises a converter section of the PCM DEC/ENC 18 that converts the sound data representing a sound message composed of a singing voice sound into music data representing a melodious music sound corresponding to the singing voice sound. In the telephony terminal apparatus, the transmitter section transmits the memorized sound data to the other party through a wireless or radio telephone line.
(Terminating Portable Telephone)

Figure 3B:
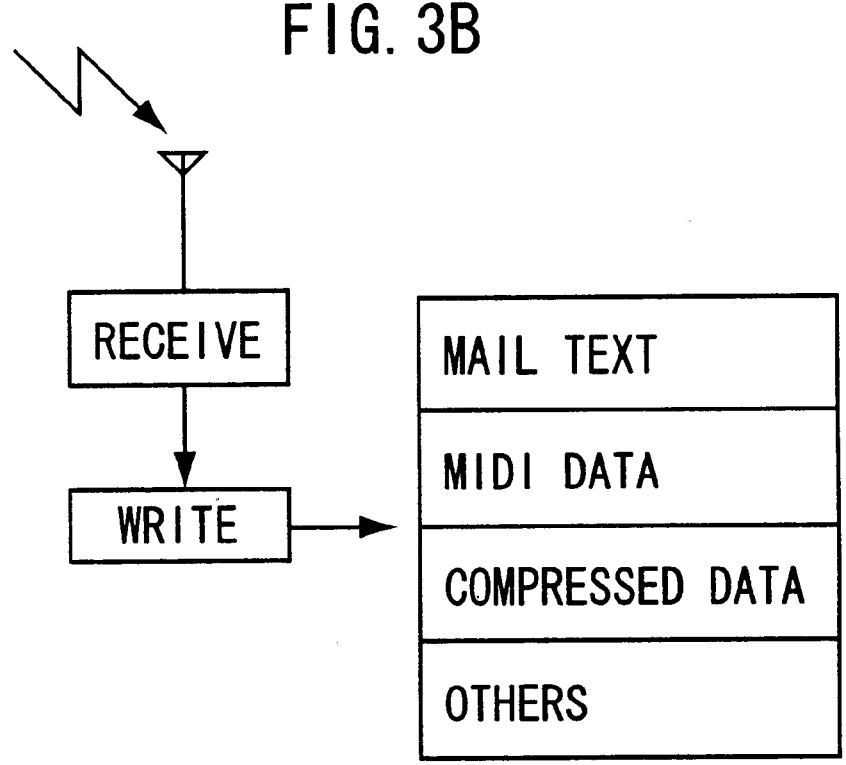

When message data arrives at the terminating portable telephone, the received data is demodulated by the transmitting and receiving interface 13 and written into a receiving buffer area of the RAM 11, based on the mode information indicative of realtime reproduction among the incoming data, as shown in FIG. 3B. At this time, if the message data written to the receiving buffer area of the RAM 11 is of musical sound data in the MIDI format and has been set to enable realtime reproduction, then musical sound data in the MIDI format is immediately read from the RAM 11 and sent to the sequencer 21. The sequencer 21 interprets the musical sound data in the MIDI format and sets tone generating parameters at the tone generator 33 at a timing based on a sound generating timing thereby to reproduce musical sound and release the musical sound from the speaker 24. In other words, the message data can be released in the form of an incoming call melody or ringing melody by performing realtime reproduction of musical sound data in the MIDI format.

If the message data written into the receiving buffer area of the RAM 11 is the compressed and encoded voice data and has been set to enable realtime reproduction, then the compressed and encoded voice data is immediately read from the RAM 11 and sent to the PCMDEC/ENC 18. The compressed and encoded voice data is decoded in the PCMDEC/ENC 18 back to a speech voice of message or a singing voice, amplified by the amplifier 23, and the speech voice or singing voice is released from the speaker 24. Thus, the sound message can be reproduced on a realtime basis upon arrival by performing realtime reproduction of the compressed and encoded voice data.

Furthermore, if the message data written to the receiving buffer area of the RAM 11 consists of the compressed and encoded voice data and the musical sound data in the MIDI format, and has been set to enable realtime reproduction, then the compressed and encoded voice data is immediately read from the RAM 11 and sent to the PCMDEC/ENC 18. In the PCMDEC/ENC 18, the compressed and encoded voice data is decoded into a voice message. At the same time, the musical sound data in the MIDI format is immediately read from the RAM 11 and sent to the sequencer 21. The sequencer 21 interprets the musical sound data in the MIDI format and sets tone generating parameters at the tone generator 33 at a timing based on a sound generating timing thereby to reproduce musical sound. The voice message and the reproduced musical sound are mixed, amplified by the amplifier 23, and released from the speaker 24. Thus, a compressed and encoded voice message and a musical sound can be reproduced on a realtime basis upon arrival by performing realtime reproduction of compressed and encoded data and musical sound data in the MIDI format.

As described, the inventive telephony terminal apparatus is constructed for exchanging a message with the other party through a telephone line. In the apparatus, a port section of the transmitting and receiving I/F 13 enters a call signal containing mode information from the 15 other party, the mode information specifying a mode of exchanging a message. A receiver section of the transmitting and receiving I/F 13 operates when the mode information specifies a realtime mode for receiving sound data from the other party immediately after the call signal, the sound data representing a sound message composed of either of a voice sound and a music sound. A memory section of the RAM 11 stores the received sound data. A reproduction section such as the tone generator 22 and the PCM DEC/ENC 18 instantly processes the stored sound data to automatically reproduce the sound message as a ringing sound to notify a call termination. When the receiver section receives the sound data in a compressively encoded form from the other party, a decoding section of the PCM DEC/ENC 18 expansively decodes the compressively encoded form of the received sound data. The receiver section receives the sound data from the other party through a wireless telephone line.

By the way, message data transferred in the realtime reproduction mode is temporarily saved at a data center connected to an exchange of a regular telephone network. Then, a terminating portable telephone is called up based on a telephone number attached to the transferred message data, and the message data that has been saved at the data center and that includes information indicative of realtime reproduction is transferred. In the terminating portable telephone that has received the message data, when the incoming button is operated after the receipt of the message data, the realtime reproduction is stopped, and the exchange will detect the stop of the realtime reproduction and will establish a line connection between the originating portable telephone and the terminating portable telephone. At the same time, the message data that has been temporarily saved at the data center is erased. This makes it possible to perform the realtime reproduction of the message data, which has been transferred in the realtime reproduction mode, then to start a call.

If the terminating portable telephone is in a state where the terminating portable telephone cannot receive message data, e.g., if a power of the portable telephone is OFF or if the terminating portable telephone is in an out-of-service area, and if the realtime reproduction mode has not been set, then the exchange will send a recorded message saying "unable to receive" to the originating portable telephone. The originating portable telephone confirms that the terminating portable telephone cannot receive data, and an end button is operated. This causes the exchange to erase the message data that has been saved at the data center.

(2) Message Reproduction Mode
(Originating Portable Telephone)

To form message data into compressed and encoded voice data, a speech voice or a singing voice input through a microphone is compressed and encoded, then saved in the transmitting buffer area of the RAM 11. To form message data into musical sound data in the MIDI format, a singing voice input through the microphone is converted into musical sound data in the MIDI format and saved in the transmitting buffer area of the RAM 11. To form message data composed of compressed and encoded voice data and musical sound data in the MIDI format, a speech voice or a singing voice input through the microphone is compressed and encoded, then saved in the transmitting buffer area of the RAM 11. At the same time, the singing voice input through the microphone is converted into musical sound data in the MIDI format and saved in the transmitting buffer area of the RAM 11.

To transmit the message data saved in the transmitting buffer area of the RAM 11 as described above, the message reproducing mode is selected and set as the transfer mode by operating a button on the control panel. Then, a telephone number of the terminating portable telephone to which the message data is to be transferred is set by operating dialing buttons, and a transmission button is operated. This operation causes the message data to be read from the transmitting buffer area of the RAM 11, making the message data ready to be transmitted by a transmitting function of the transmitting and receiving I/F 13 as shown in FIG. 3A. The message data to be transmitted may be either compressed and encoded voice data or musical sound data in the MIDI format, or both of the PCM data and MIDI data. The data to be transmitted includes mode information indicative of the message reproduction. In the musical sound data in the MIDI format, information regarding sound generation time and a time interval between notes (rests) is added to MIDI events. Namely, the selector section of the user I/F 13 can select mode information specifying a sequential mode or message reproduction mode effective to enable the other party to receive the sound data when the telephone line is connected after a call termination and effective to process the received sound data to reproduce the sound message after the telephone lines is connected.

(Terminating Portable Telephone)

When message data arrives at a terminating portable telephone, which has been set to permit reproduction of a message, the arrival of the message data is announced by a preset incoming sound or ringing sound. When a user operates an incoming button, the received data is demodulated by a receiving function of the transmitting and receiving interface 13 and written to the receiving buffer area of the RAM 11 according to mode information indicative of message reproduction among the incoming data as shown in FIG. 3B. At this time, if the message data written to the received data storage area of the RAM 11 is musical sound data in the MIDI format, then the musical sound data in the MIDI format is read from the RAM 11 and sent to the sequencer 21. The sequencer 21 interprets the musical sound data in the MIDI format and sets tone generating parameters at the tone generator 33 at a timing based on a sound generating timing thereby to reproduce musical sound and release the musical sound from the speaker 24. Thus, the musical sound data in the MIDI format is reproduced to thereby reproduce the message in the form of musical sound by operating the incoming button.

When the incoming button is operated, if the message data written to the receiving buffer area of the RAM 11 is in the form of compressed and encoded data voice data, then compressed and encoded voice data is read from the RAM 11 and sent to the PCMDEC/ENC 18. The compressed and encoded voice data is decoded back to a speech message or singing message in the PCMDEC/ENC 18, amplified by the amplifier 23, then the speech message or singing message is released from the speaker 24. As described above, a message of speech, singing, etc. can be reproduced by operating the incoming button.

When the incoming button is operated, if the message data written to the receiving buffer area of the RAM 11 is compressed and encoded voice data or musical sound data in the MIDI format, then compressed and encoded voice data is read from the RAM 11 and sent to the PCMDEC/ENC 18, and the voice data that has been compressed and encoded in the PCMDEC/ENC 18 is decoded into a speech message or singing message. At the same time, the musical sound data in the MIDI format is read from the RAM 11 and sent to the sequencer 21. The sequencer 21 interprets the musical sound data in the MIDI format and sets tone generating parameters at the tone generator 33 at a timing based on a sound generating timing thereby to reproduce musical sound. A speech voice message or a singing voice message and the reproduced musical sound are mixed, amplified by the amplifier 23, and released from the speaker 24. Thus, a musical sound and a sound message in the form of a speech voice or a singing voice can be reproduced by reproducing the musical sound data in the MIDI format and the voice data by operating the incoming button.

As described, the telephony terminal apparatus is constructed for exchanging a message with the other party through a telephone line. In the inventive apparatus, a port section of the transmitting and receiving I/F 13 responds to a call signal from the other party for generating a ringing sound when the call signal contains mode information specifying a sequential mode or reproduction mode of exchanging a message. A receiver section of the transmitting and receiving I/F 13 operates when the telephone line is connected to the other party in response to the ringing sound for receiving sound data from the other party, the sound data representing a sound message composed of either of a voice sound and a music sound. A memory section of RAM 11 stores the received sound data. A reproduction section composed of the PCM DEC/ENC 18 and the tone generator 22 processes the stored sound data to reproduce the sound message after the telephone line is connected. When, the receiver section receives the sound data in a compressively encoded form from the other party, a decoding section of the PCM DEC/ENC 18 expansively decodes the compressively encoded form of the received sound data. The receiver section of the transmitting and receiving I/F 13 receives the sound data from the other party through a wireless telephone line.

By the way, message data transferred in the message reproduction mode is temporarily saved at a data center connected to a regular exchange of telephone network. Then, a terminating portable telephone is called up based on a telephone number attached to the transferred message data, and an incoming signal is sent based on the mode information indicative of the message reproduction mode. In the terminating portable telephone, when the incoming button is operated, the exchange will detect that the incoming button has been operated, and establish a line between the originating portable telephone and the terminating portable telephone. At the same time, the message data that has been saved at the data center and includes the mode information indicative of the message reproduction is transferred to the terminating portable telephone.

If the incoming button is not operated on the terminating portable telephone end, then the exchange stands by for a predetermined time according to the mode information indicative of the message reproduction. If the terminating portable telephone has been set to enable message reproduction, then the exchange may transfer the message data to the terminating portable telephone for automatic receiving even if the incoming button is not operated. This operation causes the transferred message data to be written to the receiving buffer area of the RAM 11 of the terminating portable telephone, so that the user of the terminating portable telephone can reproduce the message data by checking the display indicating that the message data has been received.

If the terminating portable telephone is in a state wherein it cannot receive message data, e.g., if a power of the terminating portable telephone is OFF or if the portable telephone is in an out-of-service area, and if the portable telephone has not been set for enabling reproduction of a message, then the exchange will send a recorded message saying "unable to receive" to the originating portable telephone. The originating portable telephone confirms that the terminating portable telephone cannot receive data, and an end button is operated. This operation causes the exchange to erase the message data that has been saved at the data center.

(3) Attaching-to-email Mode
(Originating Portable Telephone)

First, an email is created in a email preparing mode. When a user operates dialing buttons, etc. to enter character data in the email preparing mode, the operation data is captured via the user I/F 16, converted into character data, and a resulting text is displayed on the display unit 15. As shown in FIG. 3A, the text data of a character string of a mail text that has been entered is saved in the transmitting buffer area of the RAM 11. This is the operation performed by the originating portable telephone in the attaching-to-email mode in which sound message data is attached to the created email.

To form message data to be attached to email into compressed and encoded voice data, a speech voice or a singing voice for a message is entered through a microphone (not shown). The voice signal is captured via the user I/F 16, compressed and encoded by the PCMDEC/ENC 18, and saved in the transmitting buffer area of the RAM 11.

To form message data to be attached to email into musical sound data in the MIDI format, a singing voice is entered through the microphone (not shown). The singing voice is captured via the user I/F 16, and the CPU 10 executes a program for converting the singing voice into musical sound data in the MIDI format so as to convert the singing voice into the musical sound data in the MIDI format. The converted musical sound data in the MIDI format is saved in the transmitting buffer area of the RAM 11. The singing voice in this case may be humming. The singing voice in the present invention includes humming.

To attach message data consisting of compressed and encoded voice data and musical sound data in the MIDI format to email, a voice for a message entered through the microphone as described above is compressed and encoded, and saved in the transmitting buffer area of the RAM 11. At the same time, a singing voice entered through the microphone is converted into musical sound data in the MIDI format, and saved in the transmitting buffer area of the RAM 11.

To transmit the message data saved in the transmitting buffer area of the RAM 11 by attaching it to email as set forth above, a button of the control panel is operated to set the email transfer mode. The message data to be attached to email may be either compressed and encoded voice data or musical sound data in the MIDI format, or both of the PCM data and MIDI data. For example, when message data to be attached to email is set as a message of compressed and encoded voice data and musical sound data in the MIDI format, as the telephone number of a terminating portable telephone is dialed and the transmission button is operated, a mail text, musical sound data in the MIDI format, and compressed and encoded voice data are read from the transmitting buffer area of the RAM 11, and transmitted by the transmitting function of the transmitting and receiving I/F 13 as shown in FIG. 3A. The data to be transmitted includes mode information indicative of the presence of the email message. In the musical sound data formed in the MIDI format, information regarding sound generation time and a time interval between notes (rests) is added to MIDI events.

As descried, the telephony terminal apparatus is constructed for exchanging messages in various forms including an email message and a sound message with the other party through a telephone line. In the apparatus, a writing section of the user I/F 16 can be operated to make an email message in the form of character data. A memory section of the RAM 11 memorizes sound data representing a sound message composed of either of a voice sound, and a music sound. An attaching section implemented by the CPU 10 operates when the sound message is attached to the email message for merging the sound data to the character data together with mode information specifying a mode of treating the sound message and the email message. A transmitter section of the transmitting and receiving I/F 13 transmits the sound data and the character data together with the mode information to the other party, thereby enabling the other party to reproduce the sound message and to display the email message according to the specified mode. The attaching section may specify the mode of treating the sound message and the email message such that the sound message attached to the email message is reproduced as a ringing sound when the email message is opened to display the character data.

(Terminating Portable Telephone)

When an email arrives at a terminating portable telephone, which has been set to permit reproduction of a message, the arrival of the email is announced by an incoming sound or ringing sound. At the same time, the received data is demodulated by the receiving function of the transmitting and receiving interface 13 and written to the receiving buffer area of the RAM 11 according to information indicative of attached email as shown in FIG. 3B. At this time, if musical sound data in the MIDI format and compressed and encoded voice data have been attached to the email, then the musical sound data in the MIDI format and the compressed and encoded voice data are separated and written to the receiving buffer area of the RAM 11 as shown in FIG. 3B. When a user who has received the email performs an operation for opening the email, a mail text written to the receiving buffer area of the RAM 11 is read out and the email is displayed on the display unit 15, while the message data is reproduced and audibly released.

At this time, if the message data written to the receiving buffer area of the RAM 11 is musical sound data in the MIDI format, then the musical sound data in the MIDI format is read from the RAM 11 and sent to the sequencer 21. The sequencer 21 interprets the musical sound data in the MIDI format and sets tone generating parameters at the tone generator 22 at a timing based on a sound generating timing thereby to reproduce musical sound and release the musical sound from the speaker 24. Thus, the musical sound data in the MIDI format can be reproduced by carrying out the operation for opening the email, thereby reproducing the musical sound message.

When an email is opened, if the message data written to the receiving buffer area of the RAM 11 consists of compressed and encoded voice data, then the compressed and encoded voice data is read from the RAM 11 and sent to the PCMDEC/ENC 18. In the PCMDEC/ENC 18, the compressed and encoded voice data is decoded into a message of a speech voice or a singing voice, amplified by the amplifier 23, and the message of the speech voice or the singing voice is released from the speaker 24. Thus, the compressed and encoded voice data is reproduced when the email is opened, and the message in the form of a speech voice or a singing voice is reproduced.

When the email is opened, if the message data written to the receiving buffer area of the RAM 11 consists of compressed and encoded voice data and musical sound data in the MIDI format, then the compressed and encoded voice data is read from the RAM 11 and sent to the PCM DEC/ENC 18. In the PCM DEC/ENC 18, the compressed and encoded voice data is decoded into a message of a speech voice or a singing voice. At the same time, the musical sound data in the MIDI format is immediately read from the RAM 11 and sent to the sequencer 21. The sequencer 21 interprets the musical sound data in the MIDI format and sets tone generating parameters at the tone generator 22 at a timing based on a sound generating timing thereby to reproduce musical sound. The message of the speech voice or the singing voice and the reproduced musical sound are mixed, amplified by the amplifier 23, and released from the speaker 24. Thus, the musical sound data in the MIDI format and the voice data in the PCM format can be reproduced by opening the email, and a message in the form of a musical sound, a speech voice, or a singing voice can be reproduced.

As described above, the telephony terminal apparatus is constructed for exchanging messages including an email massage and a sound message with the other party through a telephone line. In the apparatus, a port section of the transmitting and receiving I/F 13 responds to a call signal from the other party for generating a ringing sound to notify arrival of an email message accompanied by a sound message. A receiver section of the transmitting and receiving I/F 13 operates when the ringing sound is generated for automatically receiving the email message in the form of character data and for receiving the sound message in the form of sound data representing either of a voice sound and a music sound. A memory section of the RAM 11 stores the received character data and the sound data. A reproduction section composed of the PCM DEC/ENC 18 and the tone generator 22 operates when the email message is opened for processing the stored sound data to reproduce the sound message. The display section 15 operates when the email message is opened for displaying the stored character data.

By the way, the email message and the attached sound message transferred in the attaching-to-email mode are temporarily saved at a data center connected to a regular exchange of telephone network. Then, a terminating portable telephone is called up based on a telephone number attached to the transferred message data, and an incoming email signal is sent based on the mode information indicative of presence of an email among the message data. At the same time, the email and the message data saved at the data center are transferred. Upon completion of automatic receipt carried out based on the mode information indicative of the attached email in the terminating portable telephone, the exchange will detect the completion of the automatic receipt, and the transferred email and message data saved at the data center are erased.

If the terminating portable telephone is in a state wherein it cannot receive email and attached message data, e.g., if a power of the portable telephone is OFF or if the potable telephone is in an out-of-service area, then the exchange will send a recorded message saying "unable to receive" to the originating portable telephone. A user of the originating portable telephone confirms that the terminating portable telephone cannot receive data, and operates the end button. When a location of the terminating portable telephone is registered, the exchange determines that the terminating portable telephone is ready to receive email and attached message data, and transfers the message data saved at the data center to the terminating portable telephone. This operation causes the transferred email and message data to be written to the receiving buffer area of the RAM 11 in the terminating portable telephone, thus enabling the terminating portable telephone to display the email and to reproduce the message data.

(4) Attaching-to-email Realtime Reproducing Mode (Originating Portable Telephone)

First, an email message is prepared in the email preparing mode as in the case of (3) Attaching-to-email mode. Data of a character string of a mail text entered in the email preparing mode is saved in the transmitting buffer area of the RAM 11 as shown in FIG. 3A. Message data is attached to the email that has been prepared as described above, and transferred.

Message data to be attached to the email may be composed of either compressed and encoded voice data or musical sound data in the MIDI format, or both. The compressed and encoded voice data and/or the musical sound data in the MIDI format is prepared in the same manner as in the (3) Attaching-to-email mode, and the message data is respectively saved in the transmitting buffer area of the RAM 11 as shown in FIG. 3A.

To transmit the message data saved in the transmitting buffer area of the RAM 11 by attaching it to the email, a button on the control panel is operated to set the attaching-to-email realtime reproducing mode. The message data to be attached to the email may be composed of either compressed and encoded voice data or musical sound data in the MIDI format, or both. For instance, if the message data to be attached to the email is set to a message of compressed and encoded voice data and musical sound data in the MIDI format, then, when a telephone number of the terminating portable telephone is dialed and the transmission button is operated, a mail text, musical sound data in the MIDI format, and compressed and encoded voice data are read from the transmitting buffer area of the RAM 11, and transmitted by the transmitting function of the transmitting and receiving I/F 13 as shown in FIG. 3A. The data to be transmitted includes mode information indicative of the attaching-to-email realtime reproduction. In the musical sound data in the MIDI format, information regarding sound generation time and a time interval between notes (rests) is added to MIDI events.

As described in this mode, the attaching section implemented by the CPU 10 specifies the mode of treating the sound message and the email message such that the sound message is automatically reproduced as a ringing sound at a call termination, and then the email message may be opened to display the character data.

(Terminating Portable Telephone)

When the email data and the message data arrive at a terminating portable telephone, the received data is demodulated by the receiving function of the transmitting and receiving interface 13 and written to the receiving buffer area of the RAM 11 according to the mode information indicative of the attaching-to-email realtime reproduction, as shown in FIG. 3B. At this time, if musical sound data in the MIDI format and compressed and encoded voice data have been attached to the email, then the email text, the musical sound data in the MIDI format, and the compressed and encoded voice data are separated from one another and written to the receiving buffer area of the RAM 11 as shown in FIG. 3B. If the message data written to the receiving buffer area of the RAM 11 is composed of musical sound data in the MIDI format and the terminating portable telephone has been set to permit realtime reproduction, then the musical sound data in the MIDI format is immediately read from the RAM 11 and sent to the sequencer 21. The sequencer 21 interprets the musical sound data in the MIDI format and sets tone generating parameters at the tone generator 22 at a timing based on a sound generating timing thereby to reproduce musical sound, and to release the reproduced musical sound from the speaker 24. Thus, the musical sound data in the MIDI format is reproduced on the realtime basis to thereby audibly release it as an incoming call melody or ringing melody of the email.

If the message data written to the receiving buffer area of the RAM 11 consists of compressed and encoded voice data and has been set to permit realtime reproduction, then the compressed and encoded voice data is immediately read from the RAM 11 and sent to the PCMDEC/ENC 18. In the PCMDEC/ENC 18, the compressed and encoded voice data is decoded into a speech voice or a singing voice, amplified by the amplifier 23, and the message of the speech voice or the singing voice is released from the speaker 24. Thus, a message in the form of a speech voice or a singing voice can be reproduced on the realtime basis when the email arrives by performing the realtime reproduction of the compressed and encoded voice data.

If the message data written to the receiving buffer area of the RAM 11 consists of compressed and encoded voice data and musical sound data in the MIDI format, and has been set to enable realtime reproduction, then the compressed and encoded voice data is immediately read from the RAM 11 and sent to the PCMDEC/ENC 18. In the PCMDEC/ENC 18, the compressed and encoded voice data is decoded into a message of a speech voice or a singing voice. At the same time, the musical sound data in the MIDI format is read from the RAM 11 and sent to the sequencer 21. The sequencer 21 interprets the musical sound data in the MIDI format and sets tone generating parameters at the tone generator 22 at a timing based on a sound generating timing thereby to reproduce musical sound. The message of a speech voice or a singing voice and the reproduced musical sound are mixed, amplified by the amplifier 23, and released from the speaker 24. Thus, the compressed and encoded voice data and the musical sound data in the MIDI format are reproduced on a realtime basis as set forth above thereby to allow realtime reproduction of a sound message such as a speech voice or a singing voice, upon arrival of email.

As described, the telephony terminal apparatus is constructed for exchanging various types of messages including an email message and a sound message with the other party through a telephone line. In the apparatus, a port section of the transmitting and receiving interface 13 enters a call signal containing mode information from the other party, the mode information specifying a mode of exchanging a message. A receiver section of the transmitting and receiving interface 13 operates when the mode information specifies a realtime mode for automatically receiving an email message in the form of character data accompanied by a sound message in the form of sound data representing either of a voice sound and a music sound. A memory section of the RAM 11 stores the received character data and the sound data. A reproduction section composed of the PCM DEC/ENC 18 instantly processes the stored sound data to automatically reproduce the sound message as a ringing sound. The display section 15 operates when the email message may be opened after the ringing sound is generated for displaying the stored character data.

By the way, the email and message data that include mode information indicative of the attaching-to-email realtime reproduction are temporarily saved at a data center connected to a regular exchange of telephone network. Then, a terminating portable telephone is called up based on a telephone number attached to the transferred message data, and the email and the message data saved at the data center are transferred based on the mode information indicative of the attaching-to-email realtime reproduction in the message data. When the terminating portable telephone has automatically received the email and the message data according to the mode information indicative of the attaching-to-email realtime reproduction in the message data, and the incoming button is operated to stop an incoming sound or ringing sound given by the message data that has been reproduced on a realtime basis, the exchange will detect this sequence and will establish a line between the originating portable telephone and the terminating portable telephone. At the same time, the transferred message data that has been saved at the data center is erased. This allows communication between the two portable telephones to be accomplished after the message data that has been transferred in the attaching-to-email realtime reproducing mode is reproduced on a realtime basis.

Alternatively, a mail text written to the receiving buffer area of the RAM 11 may be read and the email may be displayed on the display unit 15 when the button is operated to stop the incoming sound or ringing sound given by the message data that has been reproduced on a realtime basis after the email and message data are received. In the attaching-to-email realtime reproducing mode, the email text is displayed on the display unit 15 when the email is opened.

If the terminating portable telephone is in a state wherein it cannot receive message data, e.g., if a power of the portable telephone is OFF or if the portable telephone is in an out-of-service area, and has not been set to enable the realtime reproduction, then the exchange will send a recorded message saying "unable to receive" to the originating portable telephone. A user of the originating portable telephone confirms that the terminating portable telephone cannot receive data, and operates the end button. This operation causes the exchange to erase only the message data, which has been saved at the data center, according to the mode information indicative of the attaching-to-email realtime reproduction in the message data. When a location of the terminating portable telephone is registered, the exchange determines that the terminating portable telephone is ready to receive, and transfers only the email saved at the data center to the terminating portable telephone. This operation causes the transferred email to be written to the receiving buffer area of the RAM 11, enabling the terminating portable telephone to display the email.

(5) Attaching-to-email Message Reproducing Mode (Originating Portable Telephone)

First, an email message is prepared in the email preparing mode as in the case of (3) Attaching-to-email mode. Data of a character string of a mail text entered in the email preparing mode is saved in the transmitting buffer area of the RAM 11 as shown in FIG. 3A. Message data is attached to the email that has been prepared as described above, and transferred.

Message data to be attached to the email may be composed of either compressed and encoded voice data or musical sound data in the MIDI format, or both. The compressed and encoded voice data and/or the musical sound data in the MIDI format is prepared in the same manner as in the (3) Attaching-to-email mode, and the message data is saved in the transmitting buffer area of the RAM 11 as shown in FIG. 3A.

To transmit the message data saved in the transmitting buffer area of the RAM 11 by attaching it to the email, a button on the control panel is operated to set the attached-to-email message reproducing mode. The message data to be attached to the email may be composed of either compressed and encoded voice data or musical sound data in the MIDI format, or both. For instance, if the message data to be attached to the email is set to compressed and encoded voice data and musical sound data in the MIDI format, then, when a telephone number of the terminating portable telephone is dialed and the transmission button is operated, a mail text, musical sound data in the MIDI format, and compressed and encoded voice data are read from the transmitting buffer area of the RAM 11, and transmitted by the transmitting function of the transmitting and receiving I/F 13 as shown in FIG. 3A. The data to be transmitted includes mode information indicative of the attaching-to-email message reproduction. In the musical sound data in the MIDI format, information regarding sound generation time and a time interval between notes (rests) is added to MIDI events.

In this embodiment, the attaching section specifies the mode of treating the sound message and the email message such that the sound message is reproduced if the telephone line is connected after a call termination, and then the email message may be opened to display the character data.

(Terminating Portable Telephone)

When the email and message data arrive at a terminating portable telephone that has been set to permit reproduction of a message, the arrival is audibly announced by a preset incoming sound or ringing sound. When a user operates the incoming button, the received data is demodulated by the receiving function of the transmitting and receiving interface 13 and written to the receiving buffer area of the RAM 11 according to the mode information indicative of attaching-to-email message reproduction in the message data, as shown in FIG. 3B. At this time, if musical sound data in the MIDI format and compressed and encoded voice data have been attached to the email, then the musical sound data in the MIDI format and the compressed and encoded voice data are separated from the email and written to the receiving buffer area of the RAM 11, as shown in FIG. 3B.

If the message data written to the receiving buffer area of the RAM 11 is composed of musical sound data in the MIDI format, then the musical sound data in the MIDI format is read from the RAM 11 and sent to the sequencer 21. The sequencer 21 interprets the musical sound data in the MIDI format and sets tone generating parameters at the tone generator 22 at a timing based on a sound generating timing thereby to reproduce musical sound, and release the reproduced musical sound from the speaker 24. Thus, the musical sound data in the MIDI format is reproduced when the incoming button is operated, allowing the musical sound message to be reproduced.

If the message data written to the receiving buffer area of the RAM 11 consists of compressed and encoded voice data, then the compressed and encoded voice data is read from the RAM 11 and sent to the PCMDEC/ENC 18. In the PCMDEC/ENC 18, the compressed and encoded voice data is decoded into a sound message of a speech voice or a singing voice, amplified by the amplifier 23, and the message of the speech voice or the singing voice is released from the speaker 24. Thus, the compressed or encoded voice data is reproduced by operating the incoming button, enabling a sound message in the form of a speech voice or a singing voice to be reproduced.

If the message data written to the receiving buffer area of the RAM 11 consists of the compressed and encoded voice data in the PCM format and the musical sound data in the MIDI format, then the compressed and encoded voice data is read from the RAM 11 and sent to the PCMDEC/ENC 18. In the PCMDEC/ENC 18, the compressed and encoded voice data is decoded into a message of a speech voice or a singing voice.

At the same time, the musical sound data in the MIDI format is read from the RAM 11 and sent to the sequencer 21. The sequencer 21 interprets the musical sound data in the MIDI format and sets tone generating parameters at the tone generator 22 at a timing based on a sound generating timing thereby to reproduce musical sound. The message of a speech voice or a singing voice and the reproduced musical sound are mixed, amplified by the amplifier 23, and released from the speaker 24. Thus, the compressed and encoded voice data in the PCM format and the musical sound data in the MIDI format are reproduced by operating the incoming button, allowing the reproduction of a sound message such as a musical sound, a speech voice or a singing voice.

As described above, the telephony terminal apparatus is constructed for exchanging various messages such as an email message and a sound message with the other party through a telephone line. In the apparatus, a port section of the transmitting and receiving interface 13 responds to a call signal from the other party for generating a ringing sound to notify arrival of an email message accompanied by a sound message. A receiver section of the transmitting and receiving interface 13 operates when the telephone line is connected in response to the ringing sound for receiving the email message in the form of character data and for receiving the sound message in the form of sound data representing either of a voice sound and a music sound. A memory section of the RAM 11 stores the received character data and the sound data. A reproduction section composed of the PCM DEC/ENC 18 and the tone generator 22 operates when the telephone line is connected for processing the stored sound data to reproduce the sound message. The display section 15 operates when the email message may be opened after the reproducing of the sound message for displaying the stored character data.

By the way, the email and message data transferred in the attaching-to-email message reproducing mode are temporarily saved at a data center connected to a regular exchange of telephone network. Then, a terminating portable telephone is called up based on a telephone number attached to the transferred message data, and an incoming signal is transmitted based on the mode information indicative of the attaching-to-email message reproduction in the message data. When a user of the terminating portable telephone hears an incoming sound or ringing sound and operates the incoming button or connection button, the exchange will detect this operation and will transfer the email and message data that had been saved at the data center to the terminating portable telephone.

When the user of the terminating portable telephone that has received the email and message data performs an operation to open the email after receiving the email and message data, the email text written to the receiving buffer area of the RAM 11 is read, and the email is displayed on the display unit 15. To open the email in this case, a button for terminating the reproduced message data may alternatively be operated.

If the terminating portable telephone is in a state wherein it cannot receive message data, e.g., if a power of the portable telephone is OFF or if the portable telephone is in an out-of-service area, and has not been set to enable the realtime reproduction, then the exchange will send a recorded message saying "unable to receive" to the originating portable telephone. A user of the originating portable telephone confirms that the terminating portable telephone cannot receive data, and operates the end button. When a location of the terminating portable telephone is detected and registered, the exchange determines that the terminating portable telephone is now ready to receive, and transfers the email and message data saved at the data center to the terminating portable telephone. This operation causes the transferred email and message data to be written to the receiving buffer area of the RAM 11 in the terminating portable telephone, thereby enabling the terminating portable telephone to display the email or to reproduce the message data.

The five modes for transferring message data set forth above are not limited to the transfer between portable telephones; the five modes for transferring message data may also applied to a message data transfer between general telephones having the same functions as those of the portable telephone 1.

Figure 4:
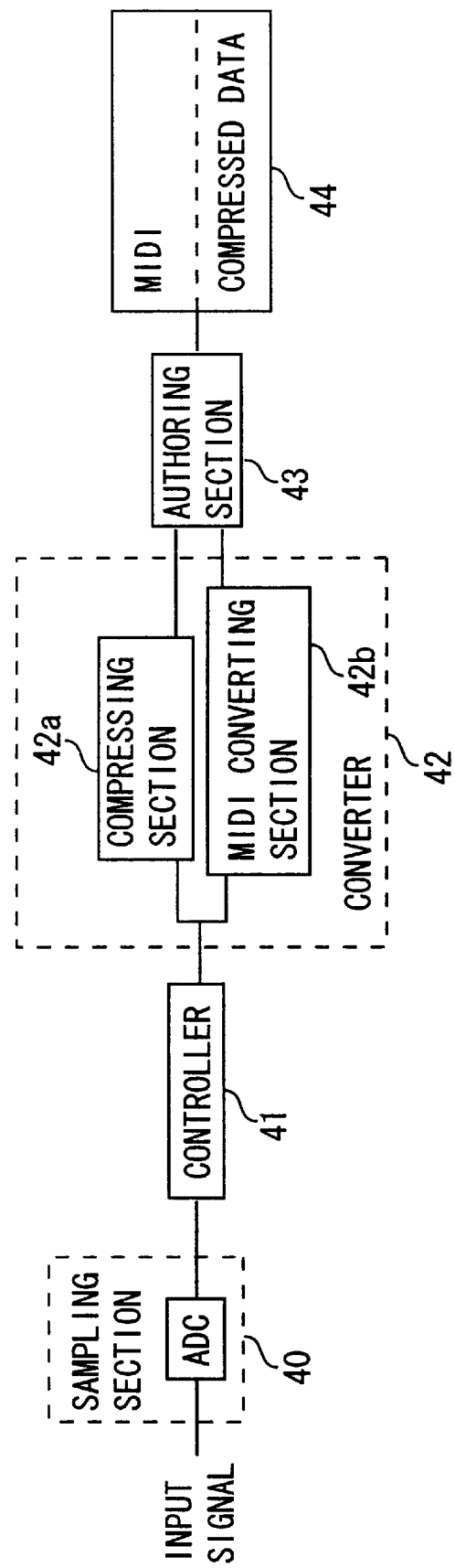
FIG. 4 is a block diagram showing a configuration for performing authoring in the telephone terminal apparatus in accordance with the present invention.

The telephone terminal apparatus in accordance with the present invention permits authoring of compressed and encoded data composed of a compressed voice and musical sound data in the MIDI format composed of a converted voice. The configuration for the authoring function is illustrated by a functional block diagram of FIG. 4. Referring to FIG. 4, a voice signal, which is an input signal, is sampled by a sampling section (ADC) 40 and converted into a digital signal. A controller 41 decides, according to setting made by a user, whether the digital signal that has been converted by the ADC 40 should be compressed and encoded or converted into musical sound data in the MIDI format. To perform compression and encoding, the controller 41 supplies the digital signal to a compressing section 42*a* to compress and encode the digital signal. The compressing and encoding in this case employs vector quantization or MP3. In the MP3 compression and encoding process, data is compressed by performing subband encoding, psychological aural weighting bit allocation, intensity stereo, adaptive block length conversion encoding, and Huffman encoding.

To perform conversion into musical sound data in the MIDI format, the controller 41 supplies the digital signal to a MIDI converting section 42*b* to carry out compression and encoding. The MIDI converting section 42*b* in this case analyzes an input voice in the form of a singing voice or humming, and takes a pitch track or an amplification track to perform conversion to a MIDI event in which information regarding a sound generation time and a time interval between notes has been added. Musical sound data in the MIDI format is generated in the form of a data string composed of the converted MIDI event and the information regarding time.

The compressed and encoded data output from the compressing section 42a and the musical sound data in the MIDI format output from the MIDI converting section 42b are supplied to an authoring section 43 to perform editing (authoring) of the data. Edited data output from an output section 44 is available in the following three modes: only the compressed and encoded data, only the musical sound data in the MIDI format, and the compressed and encoded data combined with the musical sound data in the MIDI format. The data is output from the output section 44 in chunks. At this time, a chunk flag in a chunk indicates which one of the three modes applies. The output section 44 corresponds to the RAM 11 in the configuration of the portable telephone 1 shown in FIG. 1. As described above, specified data is read from the output section 44 and transferred in the email transfer mode or the message transfer mode.

Figure 5:
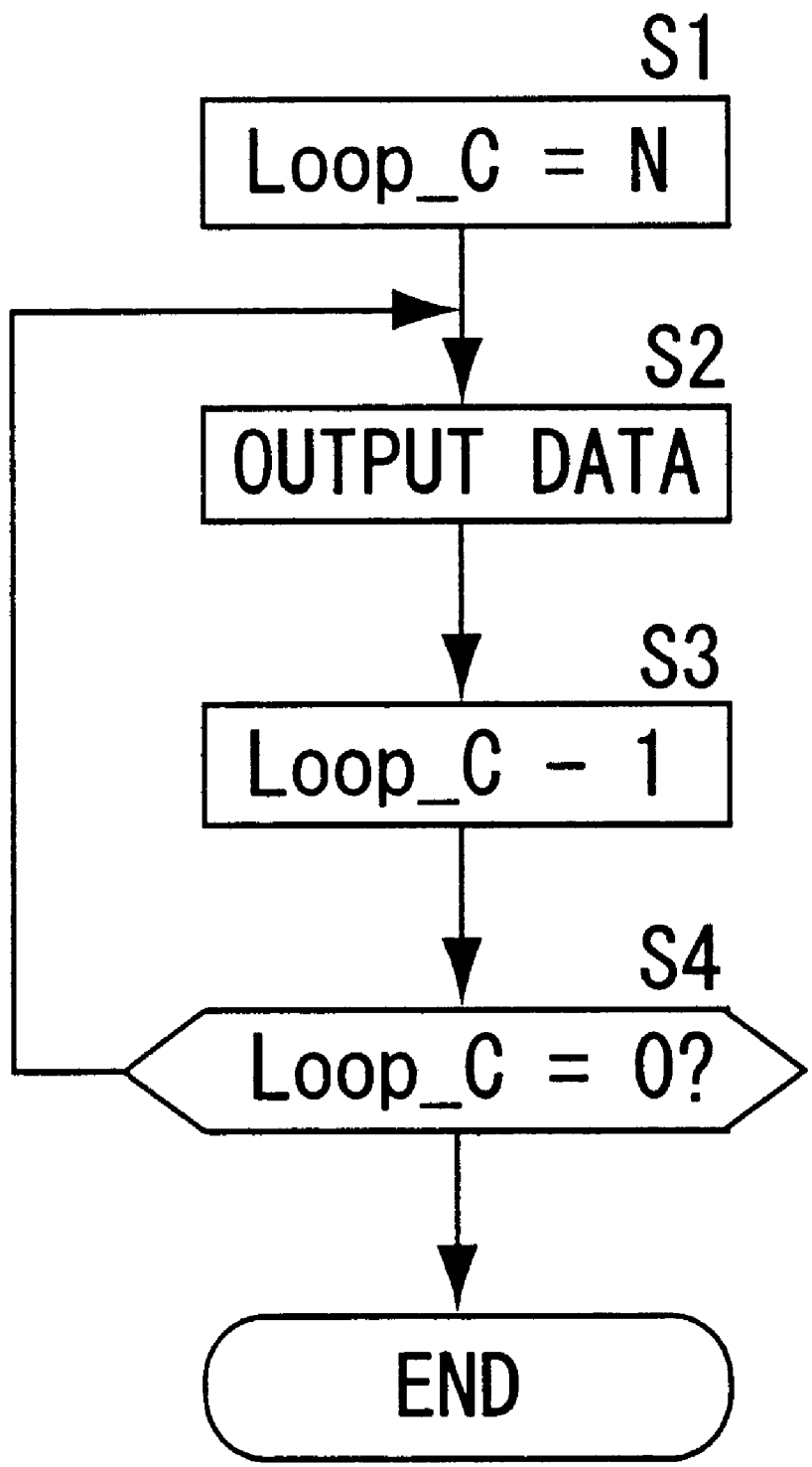
FIG. 5 is a flowchart illustrating a first authoring function in the telephone terminal apparatus in accordance with the present invention.

The authoring function in the authoring section 43 will now be described. A first authoring function performs editing in which output data is repeated (looped). A procedure of the loop editing is illustrated by a flowchart of FIG. 5. When the loop editing process is initiated, a repetitive number Loop_C is set to N in a step S1 in FIG. 5, wherein "N" can be set by a user. Then, specified data is output from the output section 44 in a step S2, and the repetitive number Loop_C is decremented by 1 in a step S3. Subsequently, in a step S4, it is determined whether the repetitive number Loop_C has reached 0 (zero), and if a determination result is negative (not 0), then the program returns to the step S2 and repeats the operations from the steps S2 to S4 until the repetitive number Loop_C reaches 0. Thus, data is generated by repeating the compressed and encoded data, or by repeating the musical sound data in the MIDI format by the repetitive number Loop_C.

A second authoring function makes it possible to add, as a background music sound, musical sound data stored in a RAM or the like to compressed and encoded data of a voice produced by the compressing section 42a. In this case, although not shown, the background music sound has been selected from among data stored in the RAM or the like and supplied to the authoring section 43 in advance, and a voice entered through a microphone and compressed and encoded with high efficiency has been supplied to the authoring section 43. The message data to which the background sound has been combined by the authoring section 43 is transferred to a telephone terminal apparatus of an associated party, then reproduced and output at the associated party. In this case, for the background sound, data having a tone or an atmosphere suited to a conversation can be selected and added.

A third authoring function is able to add a desired accompaniment to musical sound data in the MIDI format that has been converted by the MIDI converting section 42b. For the accompaniment, a musical interval, a rhythm, and a tempo can be arbitrarily set, and the accompaniment is added to the musical sound data in the MIDI format so as to create a tune.

The first through third authoring functions set forth above may be independently used, or complex authoring that combines two or more of the functions may be implemented by the authoring section 43. Such authoring can be performed by the portable telephone 1 shown in FIG. 1. To carry out the authoring, the CPU 10 executes an authoring program. Data edited by authoring is transferred to the telephone of the associated party by being attached to email as described above, except for a case where the second authoring function has been implemented.

As described above, in the telephony terminal apparatus for exchanging a message with the other party through a telephone line, an input section of the user interface 16 provides sound data representing a sound message composed of either of a voice sound and a music sound. The authoring section 43 authors the sound data to edit the sound message. The transmitter section of the transmitting and receiving interface 13 transmits the authored sound data to the other party, thereby enabling the other party to receive the authored sound data and to reproduce therefrom the edited sound message. The authoring section 43 authors the sound data to enable the other party to loop the sound message. The authoring section 43 authors the sound data to add a background sound to the sound message. The authoring section 43 authors the sound data to arrange a music accompaniment sound along the sound message.

Figure 6:
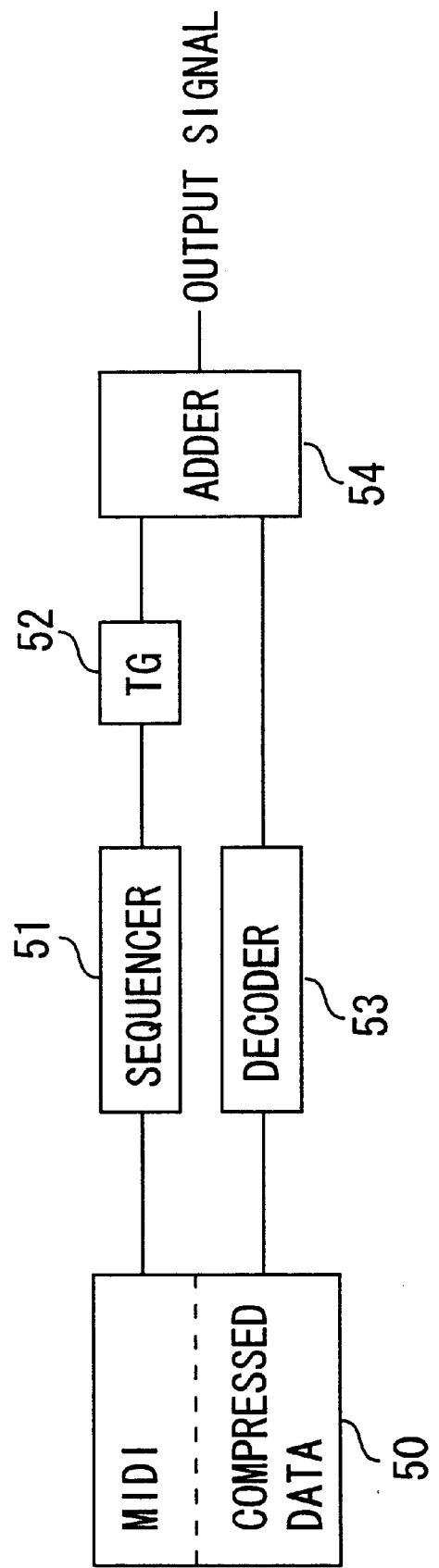
FIG. 6 is a functional block diagram illustrating a configuration of a receiving unit for receiving authored data in the telephone terminal apparatus in accordance with the present invention.

An operation of the receiver that receives the transmitted data that has been subjected to the aforesaid authoring process will now be described in conjunction with a functional block diagram of a receiving section shown in FIG. 6. Referring to FIG. 6, when a chunk flag of a received chunk is detected, the compressed voice data and the musical sound data are separated from each other. The compressed and encoded data of a separated voice and the musical sound data in the MIDI format (MIDI) are stored in an input section 50. The musical sound data is sent to a sequencer 51. The sequencer 51 interprets the musical sound data in the MIDI format, and sets tone generating parameters at a tone generator (TG) 52 at a timing based on a sound generation timing. Thus, a reproduced musical sound is output from the tone generator 52. Furthermore, the compressed and encoded data of the voice is expanded and decoded into a voice by a decoder 53. The reproduced musical sound and the decoded voice are combined by an adder 54, and output. The input section 50 corresponds to the RAM 11 in the configuration of the portable telephone 1 shown in FIG. 1.

Thus, the compressed and encoded data of a voice or the musical sound data in the MIDI format can be reproduced when the compressed and encoded data of a voice or the musical sound data in the MIDI format is transferred in one of the five transfer modes, namely, (1) realtime transfer mode, (2) message reproducing mode, (3) attaching-to-email mode, (4) attaching-to-email realtime reproducing mode, and (5) attaching-to-email message reproducing mode. Moreover, when musical sound data in the MIDI format is received as a background sound, the musical sound data is reproduced by the sequencer 51 and the tone generator 52 and output in superposed relation to the decoded voice.

The type of the tone generator incorporated in the telephone terminal apparatus in accordance with the present invention may be an FM tone generator type, a waveform memory tone generator (PCM tone generator) type, a physical model tone generator type, etc. The tone generator may be configured by hardware that employs a DSP or the like, or by software for executing a tone generating program.

In the above descriptions, the musical sound data is transferred as the data in the MIDI format to which the information regarding time and tempo has been added; however, the present invention is not limited thereto. As an alternative, the musical sound data may be transferred as musical sound data in a standard MIDI file (SMF) format.

As described above, according to the present invention, compressed and encoded data formed of an input speech voice or singing voice that has been compressed and encoded, and/or musical sound data formed of a converted singing voice may be transferred as message data. Reproducing the transferred message data on a realtime basis enables the message data to be output as an incoming sound or ringing sound. With this arrangement, a sound message formed of voice data or musical sound data can be transferred, and a calling party can be identified and the contents of the message can be known by listening to the message data upon arrival of the message.

Furthermore, a telephone terminal apparatus that has received transferred message data has a mode for automatically receiving the transferred message data and reproducing the message data on a realtime basis, and a mode for receiving and reproducing the transferred message data when an incoming button is operated.

Moreover, message data can be transferred by attaching it to an email. At this time, a telephone terminal apparatus that has received the transferred email and message data attached to the email has a mode for automatically receiving the transferred email and message data attached thereto and reproducing the email and the message data attached thereto on a realtime basis, and a mode for receiving and reproducing the transferred email and message data attached thereto when the incoming button is operated. Thus, the message data and email can be reproduced in various reproducing modes.

In addition, message data can be transferred in diverse formats. For example, compressed and encoded data or musical sound data can be looped by a predetermined number of times, a background sound may be added to compressed and encoded data, or an accompaniment may be added to musical sound data.

Thus, the present invention makes it possible to transfer information that permits transmission of a sound message in addition to an email message, and to reproduce such information in diverse reproducing modes upon receipt of the information.

What is claimed is:

1. A telephony terminal apparatus for exchanging a message with the other party through a telephone line, comprising:
   a memory section that memorizes sound data representing a sound message composed of either of a voice sound and a music sound;
   a selector section that selects mode information effective to specify a mode of exchanging a message; and
   a transmitter section that transmits the memorized sound data to the other party together with the selected mode information, thereby enabling the other party to receive the transmitted sound data and to reproduce therefrom the sound message according to the specified mode.

2. The telephony terminal apparatus according to claim 1, wherein the selector section can select mode information specifying a realtime mode effective to enable the other party to receive the sound data and to process the received sound data in realtime to automatically reproduce the sound message as a ringing sound to notify a call termination.

3. The telephony terminal apparatus according to claim 1, wherein the selector section can select mode information specifying a sequential mode effective to enable the other party to receive the sound data when the telephone line is connected after a call termination and to process the received sound data to reproduce the sound message after the telephone line is connected.

4. The telephony terminal apparatus according to claim 1, further comprising a collecting section that collects a sound message, and a coding section that compressively encodes the collected sound message into sound data suitable for transmission.

5. The telephony terminal apparatus according to claim 4, further comprising a converter section that converts the sound data representing a sound message composed of a singing voice sound into sound data representing a melodious music sound corresponding to the singing voice sound.

6. The telephony terminal apparatus according to claim 1, wherein the transmitter section transmits the memorized sound data to the other party through a wireless telephone line.

7. A telephony terminal apparatus for exchanging a message with the other party through a telephone line, comprising:
   a port section that enters a call signal containing mode information from the other party, the mode information specifying a mode of exchanging a message;
   a receiver section that operates when the mode information specifies a realtime mode for receiving sound data from the other party immediately after the call signal, the sound data representing a sound message composed of either of a voice sound and a music sound;
   a memory section that stores the received sound data; and
   a reproduction section that instantly processes the stored sound data to automatically reproduce the sound message as a ringing sound to notify a call termination.

8. The telephony terminal apparatus according to claim 7, wherein the receiver section receives the sound data in a compressively encoded form from the other party, the apparatus further comprising a decoding section that expansively decodes the compressively encoded form of the received sound data.

9. The telephony terminal apparatus according to claim 7, wherein the receiver section receives the sound data from the other party through a wireless telephone line.

10. A telephony terminal apparatus for exchanging a message with the other party through a telephone line, comprising:
    a port section that responds to a call signal from the other party for generating a ringing sound when the call signal contains mode information specifying a sequential mode of exchanging a message;
    a receiver section that operates when the telephone line is connected to the other party in response to the ringing sound for receiving sound data from the other party, the sound data representing a sound message composed of either of a voice sound and a music sound;
    a memory section that stores the received sound data; and
    a reproduction section that processes the stored sound data to reproduce the sound message after the telephone line is connected.

11. The telephony terminal apparatus according to claim 10, wherein the receiver section receives the sound data in a compressively encoded form from the other party, the apparatus further comprising a decoding section that expansively decodes the compressively encoded form of the received sound data.

12. The telephony terminal apparatus according to claim 10, wherein the receiver section receives the sound data from the other party through a wireless telephone line.

13. A telephony terminal apparatus for exchanging messages in various forms including an email message and a sound message with the other party through a telephone line, comprising:
    a writing section that can be operated to make an email message in the form of character data;
    a memory section that memorizes sound data representing a sound message composed of either of a voice sound and a music sound;

an attaching section that operates when the sound message is attached to the email message for merging the sound data to the character data together with mode information specifying a mode of treating the sound message and the email message; and a transmitter section that transmits the sound data and the character data together with the mode information to the other party, thereby enabling the other party to reproduce the sound message and to display the email message according to the specified mode.

14. The telephony terminal apparatus according to claim 13, wherein the attaching section specifies the mode of treating the sound message and the email message such that the sound message attached to the email message is reproduced as a ringing sound when the email message is opened to display the character data.

15. The telephony terminal apparatus according to claim 13, wherein the attaching section specifies the mode of treating the sound message and the email message such that the sound message is automatically reproduced as a ringing sound at a call termination, and then the email message may be opened to display the character data.

16. The telephony terminal apparatus according to claim 13, wherein the attaching section specifies the mode of treating the sound message and the email message such that the sound message is reproduced if the telephone line is connected after a call termination, and then the email message may be opened to display the character data.

17. The telephony terminal apparatus according to claim 13, further comprising a collecting section that collects a sound message, and a coding section that compressively encodes the collected sound message into sound data suitable for transmission.

18. The telephony terminal apparatus according to claim 17, further comprising a converter section that converts the sound data representing a sound message composed of a singing voice sound into sound data representing a melodious music sound corresponding to the singing voice sound.

19. The telephony terminal apparatus according to claim 13, wherein the transmitter section transmits the memorized sound data to the other party through a wireless telephone line.

20. A telephony terminal apparatus for exchanging messages in various forms including an email message and a sound message with the other party through a telephone line, comprising:

a port section that responds to a call signal from the other party for generating a ringing sound to notify arrival of an email message accompanied by a sound message;

a receiver section that operates when the ringing sound is generated for automatically receiving the email message in the form of character data and for receiving the sound message in the form of sound data representing either of a voice sound and a music sound;

a memory section that stores the received character data and the sound data;

a reproduction section that operates when the email message is opened for processing the stored sound data to reproduce the sound message; and a display section that operates when the email message is opened for displaying the stored character data.

21. The telephony terminal apparatus according to claim 20, wherein the receiver section receives the sound data in a compressively encoded form from the other party, the apparatus further comprising a decoding section that expansively decodes the compressively encoded form of the received sound data.

22. The telephony terminal apparatus according to claim 20, wherein the receiver section receives the sound data from the other party through a wireless telephone line.

23. A telephony terminal apparatus for exchanging messages in various forms including an email message and a sound message with the other party through a telephone line, comprising:

a port section that enters a call signal containing mode information from the other party, the mode information specifying a mode of exchanging messages;

a receiver section that operates when the mode information specifies a realtime mode for automatically receiving an email message in the form of character data accompanied by a sound message in the form of sound data representing either of a voice sound and a music sound;

a memory section that stores the received character data and the sound data;

a reproduction section that instantly processes the stored sound data to automatically reproduce the sound message as a ringing sound; and a display section that operates when the email message may be opened after the ringing sound is generated for displaying the stored character data.

24. The telephony terminal apparatus according to claim 23, wherein the receiver section receives the sound data in a compressively encoded form from the other party, the apparatus further comprising a decoding section that expansively decodes the compressively encoded form of the received sound data.

25. The telephony terminal apparatus according to claim 23, wherein the receiver section receives the sound data from the other party through a wireless telephone line.

26. A telephony terminal apparatus for exchanging messages in various forms including an email message and a sound message with the other party through a telephone line, comprising:

a port section that responds to a call signal from the other party for generating a ringing sound to notify arrival of an email message accompanied by a sound message;

a receiver section that operates when the telephone line is connected in response to the ringing sound for receiving the email message in the form of character data and for receiving the sound message in the form of sound data representing either of a voice sound and a music sound;

a memory section that stores the received character data and the sound data;

a reproduction section that operates when the telephone line is connected for processing the stored sound data to reproduce the sound message; and a display section that operates when the email message may be opened after the reproducing of the sound message for displaying the stored character data.

27. The telephony terminal apparatus according to claim 26, wherein the receiver section receives the sound data in a compressively encoded form from the other party, the apparatus further comprising a decoding section that expansively decodes the compressively encoded form of the received sound data.

28. The telephony terminal apparatus according to claim 26, wherein the receiver section receives the sound data from the other party through a wireless telephone line.

29. A telephony terminal apparatus for exchanging a message with the other party through a telephone line, comprising:

an input section that provides sound data representing a sound message composed of either of a voice sound and a music sound;

an authoring section that authors the sound data to edit the sound message; and a transmitter section that transmits the authored sound data to the other party, thereby enabling the other party to receive the authored sound data and to reproduce therefrom the edited sound message.

30. The telephony terminal apparatus according to claim 29, wherein the authoring section authors the sound data to enable the other party to loop the sound message.

31. The telephony terminal apparatus according to claim 29, wherein the authoring section authors the sound data to add a background sound to the sound message.

32. The telephony terminal apparatus according to claim 29, wherein the authoring section authors the sound data to arrange a music accompaniment sound along the sound message.

33. The telephony terminal apparatus according to claim 29, wherein the input section comprises a sampling section that samples a sound message composed of a voice sound, and a coding section that compressively encodes the sampled sound message into sound data suitable for transmission.

34. The telephony terminal apparatus according to claim 29, wherein the input section comprises a sampling section that samples a singing voice sound, and a converter section that converts the sampled singing voice sound into sound data representing a sound message composed of a melodious music sound corresponding to the singing voice sound.

35. The telephony terminal apparatus according to claim 29, wherein the transmitter section transmits the sound data to the other party through a wireless telephone line.

36. A method of operating a telephony terminal set for exchanging a message with the other party through a telephone line, comprising the steps of:

providing sound data representing a sound message composed of either of a voice sound and a music sound;

selecting mode information effective to specify a mode of exchanging a message; and transmitting the provided sound data to the other party together with the selected mode information, thereby enabling the other party to receive the transmitted sound data and to reproduce therefrom the sound message according to the specified mode.

37. A method of operating a telephony terminal set for exchanging a message with the other party through a telephone line, comprising the steps of:

detecting a call signal containing mode information from the other party, the mode information specifying a mode of exchanging a message;

receiving sound data from the other party immediately after the call signal when the mode information specifies a realtime mode, the sound data representing a sound message composed of either of a voice sound and a music sound;

storing the received sound data; and instantly processing the stored sound data to automatically reproduce the sound message as a ringing sound to notify a call termination.

38. A method of operating a telephony terminal set for exchanging a message with the other party through a telephone line, comprising the steps of:

responding to a call signal from the other party for generating a ringing sound when the call signal contains mode information specifying a sequential mode of exchanging a message;

receiving sound data from the other party when the telephone line is connected to the other party in response to the ringing sound, the sound data representing a sound message composed of either of a voice sound and a music sound;

storing the received sound data; and processing the stored sound data to reproduce the sound message after the telephone line is connected.

39. A method of operating a telephony terminal set for exchanging messages in various forms including an email message and a sound message with the other party through a telephone line, comprising the steps of:

writing an email message in the form of character data;

providing sound data representing a sound message composed of either of a voice sound and a music sound;

attaching the sound message to the email message by merging the sound data to the character data together with mode information specifying a mode of treating the sound message and the email message; and transmitting the sound data and the character data together with the mode information to the other party, thereby enabling the other party to reproduce the sound message and to display the email message according to the specified mode.

40. A method of operating a telephony terminal set for exchanging messages in various forms including an email message and a sound message with the other party through a telephone line, comprising the steps of:

responding to a call signal from the other party for generating a ringing sound to notify arrival of an email message accompanied by a sound message;

automatically receiving the email message in the form of character data and automatically receiving the sound message in the form of sound data representing either of a voice sound and a music sound, when the ringing sound is generated;

storing the received character data and the sound data;

processing the stored sound data to reproduce the sound message when the email message is opened; and displaying the stored character data when the email message is opened.

41. A method of operating a telephony terminal set for exchanging messages in various forms including an email message and a sound message with the other party through a telephone line, comprising the steps of:

detecting a call signal containing mode information from the other party, the mode information specifying a mode of exchanging messages;

automatically receiving an email message in the form of character data accompanied by a sound message in the form of sound data representing either of a voice sound and a music sound, when the mode information specifies a realtime mode;

storing the received character data and the sound data;

instantly processing the stored sound data to automatically reproduce the sound message as a ringing sound; and displaying the stored character data when the email message is opened after the ringing sound is generated.

42. A method of operating a telephony terminal set for exchanging messages in various forms including an email message and a sound message with the other party through a telephone line, comprising the steps of:

responding to a call signal from the other party for generating a ringing sound to notify arrival of an email message accompanied by a sound message;

receiving the email message in the form of character data and the sound message in the form of sound data representing either of a voice sound and a music sound, when the telephone line is connected in response to the ringing sound;

storing the received character data and the sound data;

processing the stored sound data to reproduce the sound message when the telephone line is connected; and displaying the stored character data when the email message is opened after the reproducing of the sound message.

43. A method of operating a telephony terminal set for exchanging a message with the other party through a telephone line, comprising the steps of:

providing sound data representing a sound message composed of either of a voice sound and a music sound;

authoring the sound data to edit the sound message; and transmitting the authored sound data to the other party, thereby enabling the other party to receive the authored sound data and to reproduce therefrom the edited sound message.

44. A machine readable medium for use in a telephony terminal set having a processor for exchanging a message with the other party through a telephone line, the medium containing program instructions executable by the processor for causing the telephony terminal set to perform a method comprising the steps of:

providing sound data representing a sound message composed of either of a voice sound and a music sound;

selecting mode information effective to specify a mode of exchanging a message; and transmitting the provided sound data to the other party together with the selected mode information, thereby enabling the other party to receive the transmitted sound data and to reproduce therefrom the sound message according to the specified mode.

45. A machine readable medium for use in a telephony terminal set having a processor for exchanging a message with the other party through a telephone line, the medium containing program instructions executable by the processor for causing the telephony terminal set to perform a method comprising the steps of:

detecting a call signal containing mode information from the other party, the mode information specifying a mode of exchanging a message;

receiving sound data from the other party immediately after the call signal when the mode information specifies a realtime mode, the sound data representing a sound message composed of either of a voice sound and a music sound;

storing the received sound data; and instantly processing the stored sound data to automatically reproduce the sound message as a ringing sound to notify a call termination.

46. A machine readable medium for use in a telephony terminal set having a processor for exchanging a message with the other party through a telephone line, the medium containing program instructions executable by the processor for causing the telephony terminal set to perform a method comprising the steps of:

responding to a call signal from the other party for generating a ringing sound when the call signal contains mode information specifying a sequential mode of exchanging a message;

receiving sound data from the other party when the telephone line is connected to the other party in response to the ringing sound, the sound data representing a sound message composed of either of a voice sound and a music sound;

storing the received sound data; and processing the stored sound data to reproduce the sound message after the telephone line is connected.

47. A machine readable medium for use in a telephony terminal set having a processor for exchanging messages in various forms including an email message and a sound message with the other party through a telephone line, the medium containing program instructions executable by the processor for causing the telephony terminal set to perform a method comprising the steps of:

writing an email message in the form of character data;

providing sound data representing a sound message composed of either of a voice sound and a music sound;

attaching the sound message to the email message by merging the sound data to the character data together with mode information specifying a mode of treating the sound message and the email message; and transmitting the sound data and the character data together with the mode information to the other party, thereby enabling the other party to reproduce the sound message and to display the email message according to the specified mode.

48. A machine readable medium for use in a telephony terminal set having a processor for exchanging messages in various forms including an email message and a sound message with the other party through a telephone line, the medium containing program instructions executable by the processor for causing the telephony terminal set to perform a method comprising the steps of:

responding to a call signal from the other party for generating a ringing sound to notify arrival of an email message accompanied by a sound message;

automatically receiving the email message in the form of character data and automatically receiving the sound message in the form of sound data representing either of a voice sound and a music sound, when the ringing sound is generated;

storing the received character data and the sound data;

processing the stored sound data to reproduce the sound message when the email message is opened; and displaying the stored character data when the email message is opened.

49. A machine readable medium for use in a telephony terminal set having a processor for exchanging messages in various forms including an email message and a sound message with the other party through a telephone line, the medium containing program instructions executable by the processor for causing the telephony terminal set to perform a method comprising the steps of:

detecting a call signal containing mode information from the other party, the mode information specifying a mode of exchanging messages;

automatically receiving an email message in the form of character data accompanied by a sound message in the form of sound data representing either of a voice sound and a music sound, when the mode information specifies a realtime mode;

storing the received character data and the sound data;

instantly processing the stored sound data to automatically reproduce the sound message as a ringing sound; and displaying the stored character data when the email message is opened after the ringing sound is generated.

50. A machine readable medium for use in a telephony terminal set having a processor for exchanging messages in various forms including an email message and a sound message with the other party through a telephone line, the medium containing program instructions executable by the processor for causing the telephony terminal set to perform a method comprising the steps of:

responding to a call signal from the other party for generating a ringing sound to notify arrival of an email message accompanied by a sound message;

receiving the email message in the form of character data and the sound message in the form of sound data representing either of a voice sound and a music sound, when the telephone line is connected in response to the ringing sound;

storing the received character data and the sound data;

processing the stored sound data to reproduce the sound message when the telephone line is connected; and displaying the stored character data when the email message is opened after the reproducing of the sound message.

51. A machine readable medium for use in a telephony terminal set having a processor for exchanging a message with the other party through a telephone line, the medium containing program instructions executable by the processor for causing the telephony terminal set to perform a method comprising the steps of:

providing sound data representing a sound message composed of either of a voice sound and a music sound;

authoring the sound data to edit the sound message; and transmitting the authored sound data to the other party, thereby enabling the other party to receive the authored sound data and to reproduce therefrom the edited sound message.

* * * * *